US009183643B2

(12) United States Patent
Matsumura et al.

(10) Patent No.: US 9,183,643 B2
(45) Date of Patent: Nov. 10, 2015

(54) APPARATUS AND METHOD FOR GENERATING TYPICAL COLORS FOR IMAGE CODING

(71) Applicant: KABUSHIKI KAISHA TOSHIBA, Tokyo (JP)

(72) Inventors: Atsushi Matsumura, Kanagawa-ken (JP); Tatsuya Tanaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 13/948,370

(22) Filed: Jul. 23, 2013

(65) Prior Publication Data

US 2014/0064612 A1 Mar. 6, 2014

(30) Foreign Application Priority Data

Sep. 4, 2012 (JP) ................................. 2012-194599

(51) Int. Cl.
*G06T 9/00* (2006.01)
(52) U.S. Cl.
CPC ........................................ *G06T 9/00* (2013.01)
(58) Field of Classification Search
CPC ........................................................ G06T 9/00
USPC ................................................. 382/166, 251
See application file for complete search history.

(56) References Cited

U.S. PATENT DOCUMENTS

| 6,728,400 B1* | 4/2004 | Matsugu ........................ 382/164 |
| 6,992,783 B1* | 1/2006 | Sumiuchi ...................... 358/1.15 |
| 8,587,604 B1* | 11/2013 | Kanter et al. .................. 345/589 |
| 2001/0053248 A1* | 12/2001 | Maeda ........................... 382/165 |
| 2003/0161541 A1* | 8/2003 | Ridge ............................ 382/245 |
| 2004/0013297 A1* | 1/2004 | Lo ................................. 382/166 |
| 2005/0185000 A1* | 8/2005 | Nonaka ......................... 345/590 |

(Continued)

FOREIGN PATENT DOCUMENTS

JP 2011-249947 12/2011

OTHER PUBLICATIONS

Periasamy et al. ("A Common Palette Creation Algorithm for Multiple Images with Transparency Information," International Conference on Advances in Computing, Control and Telecommunication Technologies, 2009).*

(Continued)

*Primary Examiner* — Yubin Hung
(74) *Attorney, Agent, or Firm* — Nixon & Vanderhye, P.C.

(57) ABSTRACT

According to one embodiment, an acquisition unit acquires a pixel block having a predetermined size from image data to be coded. A comparison unit calculates a distance between a color of a target pixel in the pixel block and each of a plurality of typical colors, and selects a typical color of which the distance is a minimum distance from the plurality of typical colors. A decision unit assigns a first index representing the selected typical color to the target pixel if the minimum distance is smaller than a first threshold, assigns a second index representing a new typical color to the target pixel if the minimum distance is larger than the first threshold, and adds the color of the target pixel as the new typical color when the second index is assigned. A coding unit codes the selected typical color, the new typical color, the first index and the second index.

12 Claims, 14 Drawing Sheets

(56) References Cited

U.S. PATENT DOCUMENTS

| | | | |
|---|---|---|---|
| 2006/0204086 A1* | 9/2006 | Gargi | 382/166 |
| 2008/0031587 A1* | 2/2008 | Chen et al. | 386/68 |
| 2008/0144952 A1* | 6/2008 | Chen et al. | 382/239 |
| 2009/0303505 A1* | 12/2009 | Yago | 358/1.9 |
| 2011/0013832 A1* | 1/2011 | Itoh | 382/167 |
| 2012/0087576 A1* | 4/2012 | Abe et al. | 382/162 |

OTHER PUBLICATIONS

Balasubramanian et al. ("A New Approach to Palette Selection for Color Images," Journal of Imaging Technology, vol. 17, No. 6, Dec. 1991).*

P. Heckbert, "Color Image Quantization for Frame Buffer Display", *Computer Graphics*, vol. 16, No. 3, 1982, pp. 297-307.

* cited by examiner

| palette 0 | R=N/A G=N/A B=N/A |
| palette 1 | R=N/A G=N/A B=N/A |
| palette 2 | R=N/A G=N/A B=N/A |
| palette 3 | R=N/A G=N/A B=N/A |
| palette 4 | R=N/A G=N/A B=N/A |
| palette 5 | R=N/A G=N/A B=N/A |
| palette 6 | R=N/A G=N/A B=N/A |
| palette 7 | R=N/A G=N/A B=N/A |

FIG.13

| palette 0 | R=128 G=128 B=128 |
| palette 1 | R=N/A G=N/A B=N/A |
| palette 2 | R=N/A G=N/A B=N/A |
| palette 3 | R=N/A G=N/A B=N/A |
| palette 4 | R=N/A G=N/A B=N/A |
| palette 5 | R=N/A G=N/A B=N/A |
| palette 6 | R=N/A G=N/A B=N/A |
| palette 7 | R=N/A G=N/A B=N/A |

FIG.14

| palette 0 | R=128 G=128 B=128 |
| palette 1 | R=128 G=64 B=64 |
| palette 2 | R=N/A G=N/A B=N/A |
| palette 3 | R=N/A G=N/A B=N/A |
| palette 4 | R=N/A G=N/A B=N/A |
| palette 5 | R=N/A G=N/A B=N/A |
| palette 6 | R=N/A G=N/A B=N/A |
| palette 7 | R=N/A G=N/A B=N/A |

FIG.15

| palette 0 | R=128 G=128 B=128 |
| palette 1 | R=128 G=64 B=64 |
| palette 2 | R=128 G=96 B=128 |
| palette 3 | R=64 G=128 B=64 |
| palette 4 | R=0 G=0 B=0 |
| palette 5 | R=128 G=128 B=64 |
| palette 6 | R=N/A G=N/A B=N/A |
| palette 7 | R=N/A G=N/A B=N/A |

FIG.16

| palette 0 | R=N/A G=N/A B=N/A |
| palette 1 | R=N/A G=N/A B=N/A |
| palette 2 | R=N/A G=N/A B=N/A |
| palette 3 | R=N/A G=N/A B=N/A |

FIG.17

| palette 0 | R=128 G=128 B=128 |
| palette 1 | R=128 G=64 B=64 |
| palette 2 | R=N/A G=N/A B=N/A |
| palette 3 | R=N/A G=N/A B=N/A |

FIG.18

| palette 0 | R=128 G=128 B=128 |
| palette 1 | R=128 G=64 B=64 |
| palette 2 | R=128 G=96 B=128 |
| palette 3 | R=64 G=128 B=64 |

FIG.19

| palette 0 | R=128 G=128 B=128 |
| palette 1 | R=128 G=64 B=64 |
| palette 2 | R=64 G=128 B=64 |
| palette 3 | R=0 G=0 B=0 |
| palette 4 | R=128 G=128 B=64 |
| palette 5 | R=N/A G=N/A B=N/A |
| palette 6 | R=N/A G=N/A B=N/A |
| palette 7 | R=N/A G=N/A B=N/A |

APPARATUS AND METHOD FOR GENERATING TYPICAL COLORS FOR IMAGE CODING

CROSS-REFERENCE TO RELATED APPLICATION

This application is based upon and claims the benefit of priority from Japanese Patent Application No. 2012-194599, filed on Sep. 4, 2012; the entire contents of which are incorporated herein by reference.

FIELD

Embodiments described herein relate generally to an apparatus and a method for coding an image.

BACKGROUND

When natural image data is coded, by using JPEG for a static image, or by using MPEG for a moving image, effective data compression can be performed. On the other hand, as for CG image data such as a PC screen, in comparison with above method, by using a color palette-image coding method (each pixel is represented by a plurality of typical colors (palettes)), the data compression can be more effectively performed.

In the color palette-image coding method, following decisions are important, i.e., the target image is represented by which typical colors, and each pixel therein is represented by which typical color.

For example, by calculating a histogram of each color in an image block, conventional technique to determine a typical color of the image block based on the histogram is well known. In this technique, the histogram is calculated whenever one typical color is generated. Accordingly, great many calculation costs thereof are necessary. Furthermore, the histogram is calculated for all colors in the image block. Accordingly, in order to calculate the histogram, a memory having a very large capacity is necessary. As a result, for example, hardware-packaging of the memory (such as LSI) is difficult.

BRIEF DESCRIPTION OF THE DRAWINGS

FIG. 13 is one example of an initial state of eight color palettes.

FIG. 14 is one example of typical colors in the eight color palettes (when one pixel is processed).

FIG. 15 is one example of typical colors in the eight color palettes (when two pixels are processed).

FIG. 16 is one example of typical colors in the eight color palettes (when sixteen pixels are processed).

FIG. 17 is one example of typical colors in four color palettes.

FIG. 18 is one example of typical colors in the four color palettes (when two pixels are processed).

FIG. 19 is one example of typical colors in the four color palettes (when twelve pixels are processed, threshold A=9).

DETAILED DESCRIPTION

According to one embodiment, an image coding apparatus includes an acquisition unit, a comparison unit, a decision unit, and a coding unit. The acquisition unit is configured to acquire a pixel block having a predetermined size from image data to be coded. The comparison unit is configured to calculate a distance between a color of a target pixel in the pixel block and each of a plurality of typical colors, and to select a typical color of which the distance is a minimum distance from the plurality of typical colors. The decision unit is configured to assign a first index representing the selected typical color to the target pixel if the minimum distance is smaller than a first threshold, to assign a second index representing a new typical color to the target pixel if the minimum distance is larger than the first threshold, and to add the color of the target pixel as the new typical color when the second index is assigned. The coding unit is configured to code the selected typical color, the new typical color, the first index and the second index.

Various embodiments will be described hereinafter with reference to the accompanying drawings.

The First Embodiment

In an image coding apparatus 1 of the first embodiment, as to a target pixel to be coded, an index representing a typical color to represent the target pixel is assigned thereto, and the typical color and the index are coded. When the typical color (palette) is generated, a histogram of each color included in a pixel block is not calculated. Accordingly, a memory capacity necessary for processing can be reduced. Color information of the typical color and the target pixel may be represented by a color system such as RGB, YUV, YCbCr, or HSV. In the first embodiment, processing (scan) of the pixel block and the target pixel are performed in order of raster scan. However, this processing may be performed in order of another scan.

Figure 1:
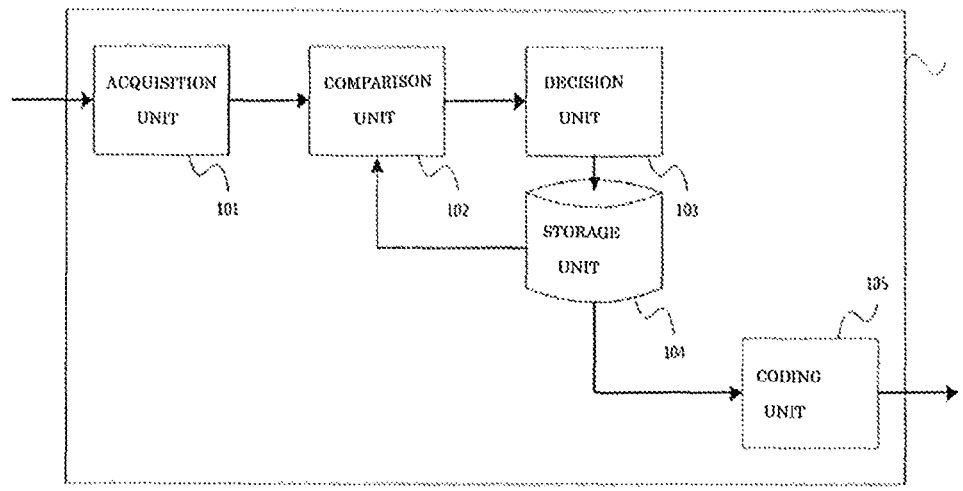
FIG. 1 is a block diagram of an image coding apparatus according to the first embodiment.

FIG. 1 is a block diagram of the image coding apparatus 1. The image coding apparatus 1 includes an acquisition unit 101, a comparison unit 102, a decision unit 103, a storage unit 104, and a coding unit 105.

The acquisition unit 101 acquires a pixel block having a predetermined size from image data to be coded. Furthermore, the acquisition unit 101 calculates a distance between each typical color (previously determined) and a color of a target pixel in the pixel block, and selects a typical color of which distance is the shortest (minimum distance) from the each typical color.

If the minimum distance is smaller than a threshold A, the decision unit 103 assigns an index representing a typical color having the minimum distance, to the target pixel. If the minimum distance is larger than the threshold A, the decision unit 103 adds a pixel value of the target pixel as a new typical color, and assigns an index representing the new typical color to the target pixel. The storage unit 104 stores the typical color. Moreover, in the first embodiment, the index representing a typical color is numbered as a value in order of adding the typical color. The index of the first typical color is numbered as "0", and numbered "1", "2", . . . in order. The coding unit 105 codes the typical color (i.e., palette) and the index assigned to the target pixel.

Figure 5:
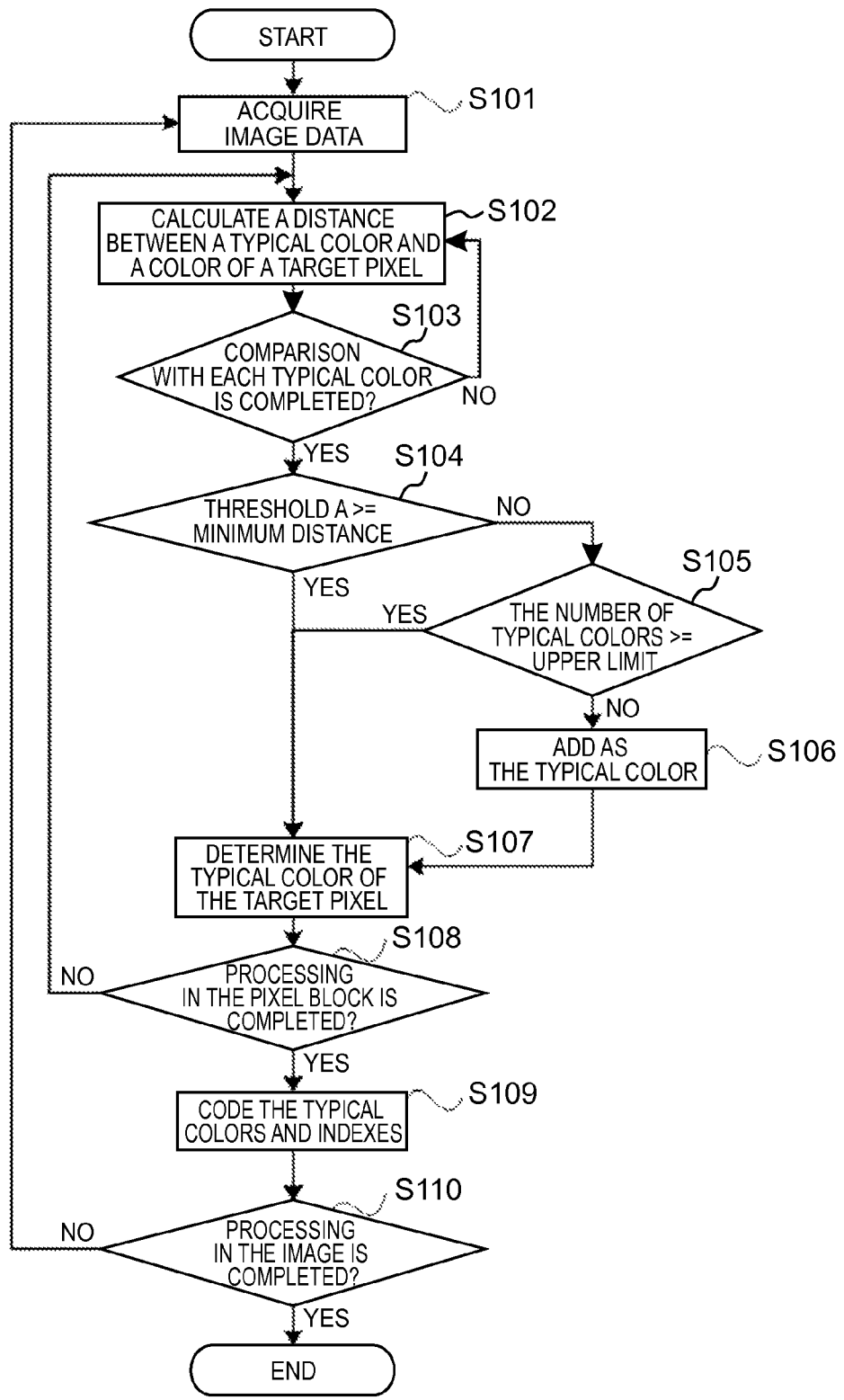
FIG. 5 is a flow chart of processing of the image coding apparatus according to the first embodiment.

FIG. 5 is a flow chart of processing of the image coding apparatus 1. Hereinafter, a flow of processing executed by the image coding apparatus of the first embodiment will be explained.

The acquisition unit 101 acquires a pixel block having a predetermined size from image data to be coded (S101).

The comparison unit 102 compares each typical color and a color of a target pixel in the pixel block (S102). The comparison unit 102 checks whether distances between all typical colors (stored in the storage unit 103) and the color of the target pixel are already calculated (S103). If the comparison unit 102 confirms that the distances are already calculated (Yes at S103), the comparison unit 102 sends a typical color having the minimum distance among the distances to the decision unit 103, and processing is forwarded to S104.

The decision unit 103 compares the minimum distance with a threshold A (S104). If the minimum distance is smaller than the threshold A (Yes at S104), processing is forwarded to S107. If the minimum distance is larger than the threshold A, processing is forwarded to S105. The decision unit 103 determines that a color of the target pixel is represented by the typical color having the minimum distance (S107).

The decision unit 103 checks whether the number of typical colors (stored in the storage unit 104) is larger than (or equal to) a predetermined upper limit (S105). If the number of typical colors is smaller than (or equal to) the upper limit (No at S105), processing is forwarded to S106. If the number of typical colors is larger than the upper limit (Yes at S105), processing is forwarded to S107 because a new typical color cannot be further added.

The decision unit 103 adds a color of the target pixel as a new typical color to the storage unit 104, and makes the storage unit 104 store the color (S106). The decision unit 103 checks whether an index of typical color is already assigned to all target pixels in the pixel block (S108). If the index is not assigned to at least one target pixel (No at S108), processing is returned to S102. If the index is already assigned to all target pixels (Yes at S108), processing is forwarded to S109.

The coding unit 105 codes typical colors (i.e., palette), indexes corresponding to the typical colors (stored in the storage unit 104), and indexes assigned to target pixels in the pixel block, and outputs coded data thereof (S109). The coding unit 105 checks whether coding is already executed to all pixel blocks in image data to be coded (S110). If the coding is not executed at least one pixel block yet (No at S110), processing is returned to S101. If the coding is already executed to all pixel blocks (Yes at S110), the coding is completed.

Figure 9:
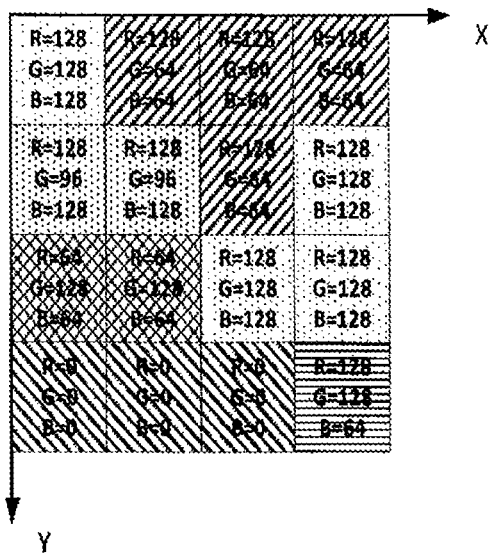
FIG. 9 is one example of a pixel block.

Hereinafter, detail processing of each step will be explained. A shape of the pixel block (acquired by the acquisition unit 101 at S101) may be any of a square having N×N pixels, a rectangle having M×N pixels, and a line having M×1 pixels (M, N: natural number). FIG. 9 shows an example of the pixel block. In FIG. 9, one rectangle represents each target pixel, and each color therein is represented as a value in RGB space (dynamic range is eight bits [0:255]). Hereinafter, by referring to FIG. 9, the concrete example will be explained.

The comparison unit 102 calculates a distance between a color of the target pixel and each typical color stored in the storage unit 104 (S102). FIG. 13 shows one example of an initial state of typical colors. In the first embodiment, palette X (X=0, 1, . . . , 7: an index of each typical color) and the typical color are correspondingly stored, and an upper limit of the number of typical colors is eight colors (eight palettes). At the initial state when processing is started, color information of R, G, B of each typical color is N/A (not available). Here, the initial state may be predetermined value such as "R=0, G=0, B=0". Furthermore, if previous information that which color frequently appears is already known, by setting this color to the initial state of the typical color, efficiency of the processing can be often raised.

In order to calculate a color of the target pixel (in the pixel block) and a typical color, following equation is used.

$$\text{Distance } a = \alpha \times |(R \text{ of the target pixel}) - (R \text{ of the typical color})| + \quad (1)$$
$$\beta \times |(G \text{ of the target pixel}) - (G \text{ of the typical color})| +$$
$$\gamma \times |(B \text{ of the target pixel}) - (B \text{ of the typical color})|$$

In the equation (1), $\alpha$ is a weight coefficient of R, $\beta$ is a weight coefficient of G, and $\gamma$ is a weight coefficient of B. In the first embodiment, an example of "$\alpha=\beta=\gamma=1$" is also explained. However, by considering Bayer arrangement, G may be preceded such as "$\alpha=\gamma=1, \beta=2$". Furthermore, in case of YUV color system, the distance may be calculated in the same way as the equation (1). In this case, for example, a weight coefficient of Y is $\alpha$, a weight coefficient of U is $\beta$, and a weight coefficient of V is $\gamma$. In order not to occur the color distortion, UV may be preceded such as "$\alpha=1, \beta=\gamma=2$". Furthermore, in case of raising PSNR as objective image quality, Y may be preceded such as "$\alpha=2, \beta=\gamma=1$".

In above-mentioned example, the distance is calculated with eight bits accuracy. However, as a modification thereof, the distance may be calculated by dropping several low order bits of each color. As processing to drop the several low order bits, for example, arithmetic right shift is used. After the color information is compressed from eight bits to seven bits by dropping the least significant bit, the distance is calculated. In this case, even if positive and negative information of one bit (increased when the difference is calculated) is included, the processing can be performed with original eight bits. As a result, the number of bits of the distance cannot be increased.

In the first embodiment, a distance between a color of the target pixel (As to a left upper pixel in the pixel block of FIG. 9, R=128, G=128, B=128) and a typical color (N/A) of the initial state of FIG. 13 is defined as infinity. The distance between the typical color (N/A) of the initial state and the target pixel is a maximum among allowable values. For example, if a dynamic range of the color information is eight bits, the distance is 255. In case of "$\alpha=\beta=\gamma=1$", the distance is 765 (=255×3).

Moreover, among typical colors stored in the storage unit 104, the comparison unit 102 counts the number of non-N/A (the number of typical colors newly added), and calculates a distance between each typical color (not N/A) and a color of the target pixel. In this case, unnecessary comparison with N/A is deleted. As a result, in case of hardware-packaging, the number of steps (S103) to decide whether comparison with each typical color is completed is reduced, and processing load thereof can be reduced. Moreover, in case of software-packaging, processing load to calculate the distance can be reduced. If the number of non-N/A is not counted, the distance with all typical colors (In above example, eight colors) is calculated. In the first embodiment, on assumption that the number of typical colors newly added is counted, following explanation will be done.

In case of software-packaging, when a color of the target pixel is replaced with a typical color, the decision unit 103 checks the distortion amount by using a threshold A. If the distortion amount is larger than the threshold A (No at S104), by setting the color of the target pixel to the typical color (S106), the distortion amount is controlled not to be over the threshold A. Various methods for determining the threshold A can be applied. For example, among a dynamic range of eight bits of each color (R, G, B), if a distortion amount of two low order bits is allowed, the distortion amount 3 (=maximum of two bits) occurs at each of RGB, and the threshold "A(=3+3+3)=9" is determined. Moreover, in the first embodiment, in case of this threshold A (=9), following explanation will be done.

If the threshold A is smaller, the distortion amount is fewer, and the image quality becomes higher. On the other hand, by adding many typical colors, an amount of coded data increases. Conversely, if the threshold A is larger, the distortion amount is larger, and the image quality falls. On the other hand, the amount of coded data decreases because the number of typical colors is few. Accordingly, the decision unit 103 may try the threshold A by repeat processing so that the amount of coded data is equal to a desired amount. As the repeat processing, by gradually changing the threshold A, the threshold A is calculated so that a relationship between an amount of the typical color and the distortion amount represents the desired amount.

Furthermore, the threshold A may be adjusted based on feedback control. As the feedback control, a correlative relationship between a data amount and the threshold A is estimated based on a relationship between a previous data amount and the threshold A, and the threshold A to be operated next is determined. For example, in case of the threshold A0, when the coding amount becomes too large, next processing is executed with the thresholds "A=A0×2". In case of the threshold "A=A0×2", when the coding amount becomes too small, by setting the threshold A to "(A0×2+A0)/2", the threshold A is gradually converged. Furthermore, by executing a plurality of thresholds A in parallel, one threshold A with which the amount of coded data is nearly equal to a desired amount can be selected from the plurality of thresholds A. This modification will be explained afterwards.

Processing for a first target pixel in the pixel block is explained. All typical colors stored in the storage unit 104 are N/A. A distance between a color of the first target pixel and each typical color is a maximum (=255×3=765) larger than the threshold A(=9) (No at S104). Furthermore, as to an upper limit of the typical color "8", the number of counts that new typical color is added is "0" (No at S105). Accordingly, processing is forwarded to S106. The decision unit 103 adds color information of RGB of the first target pixel to a typical color of palette 0 (index 0) in the storage unit 104 (S106). FIG. 14 shows typical color information stored in the storage unit 104 after color of the first target pixel is added. Then, the decision unit 103 assigns an index 0 to the first target pixel (S107). The decision unit 103 confirms that one pixel is already processed among sixteen pixels in the pixel block (No at S108), and processing is returned to a step (S102) to calculate a color of a second target pixel and the typical color.

Next, processing for the second target pixel in the pixel block is explained. The comparison unit 102 calculates a distance between a color of the second target pixel and each typical color stored in FIG. 14 (S102). The distance between the color of the second target pixel and palette 0 is "0+64+64=128". Other palettes therein are N/A, and the distance between the color of the second target pixel and each of other palettes is 765. In the first embodiment, the distance between a color of the target pixel and an added typical color only. Accordingly, after the distance between the color of the second target pixel and palette 0 is calculated (Yes at S103), processing is forwarded to S104. The comparison unit 102 sends the distance 128 (compared with palette 0) to the decision unit 103 as the minimum distance (S104).

This minimum distance (=128) is larger than the threshold A (=9) (No at S104), and processing is forwarded to S105. The number of counts (=1) that new typical color is added is smaller than (or equal to) the upper limit (=1) (No at S105), and processing is forwarded to S106. The decision unit 103 adds color information of RGB of the second target pixel to a typical color of palette 1 (index 1) in the storage unit 104 (S106). FIG. 15 shows typical color information stored in the storage unit 104 after color of the second target pixel is added. Then, the decision unit 103 assigns an index 1 to the second target pixel (S107).

Figure 10:
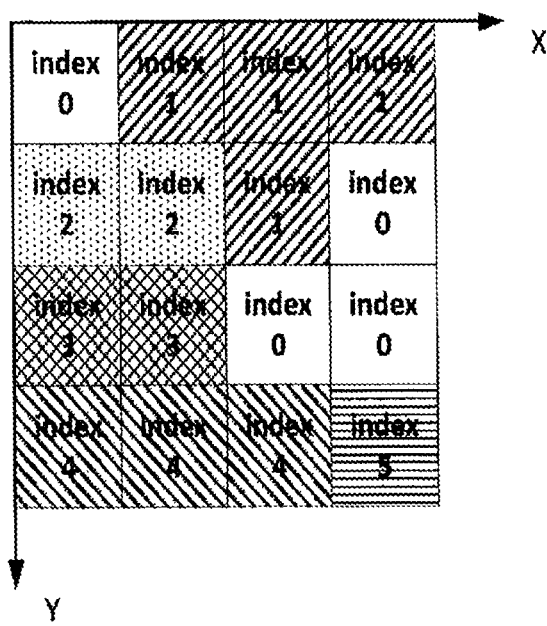
FIG. 10 is indexes assigned to the pixel block of FIG. 9 (eight color palettes).

After processing for all target pixels in the pixel block shown in FIG. 9 is completed, this processing result is explained. FIG. 16 shows typical color information stored in the storage unit 104 after processing for all target pixels is completed (Yes at S108). The storage unit 104 stores five typical colors. FIG. 10 shows indexes assigned to each target pixel in the pixel block of FIG. 9.

Figure 21:
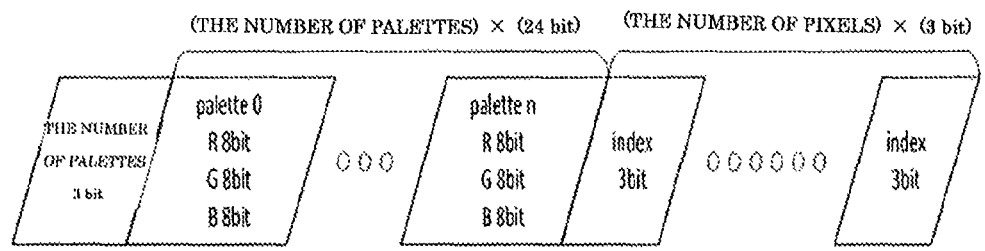
FIG. 21 is a schematic diagram of one example of data structure (when quantization of typical colors is not performed).

The coding unit 105 codes typical colors (i.e., palette), indexes corresponding to the typical colors, and indexes assigned to target pixels in the pixel block, and outputs coded data thereof (S109). FIG. 21 shows one example of data structure of the coded pixel block. As shown in FIG. 21, first, an upper limit (=8) of typical colors storable into the storage unit 104 is coded by representing with three bits. Next, the number of palettes used is coded, and continually, color information ((eight bits of each of RGB)×(the number of palettes)) of each palette is coded. Last, an index indicating that each target pixel is represented by which typical color is coded with ((three bits)×(the number of pixels)). Here, "(three bits)×(the number of pixels)" can represent five palettes (five typical colors).

In above explanation, all information is coded with fixed length. For example, when indexes are coded, variable length coding method (Huffman coding, arithmetic coding) to vary the coding length based on the occurrence frequency may be used. Alternatively, Run Length Encoding to collectively code continuous indexes may be used.

In above explanation, coding processing of the pixel block shown in FIG. 9 is completed (No at S110). This processing is repeatedly executed to all pixel blocks in the image data to be coded.

In the first embodiment, as mentioned-above, the storage unit 104 stores palettes of which upper limit is "8". Accordingly, after coding all target pixels, a distortion amount of the coded target pixel is smaller than an allowable distortion amount (threshold A). As a result, coded data is lossless compressed data without distortion. Hereinafter, in case that the upper limit of the number of palettes is "4", operation for the pixel block shown in FIG. 9 is explained. Moreover, an initial state of typical colors stored in the storage unit 104 is N/A shown in FIG. 17. Furthermore, the threshold A is "9". In this case, until twelve pixels among target pixels in the pixel block, the same processing as above-mentioned first embodiment is repeated. FIG. 19 shows typical colors newly added to the storage unit 104 after the twelve pixels are already processed.

Figure 11:
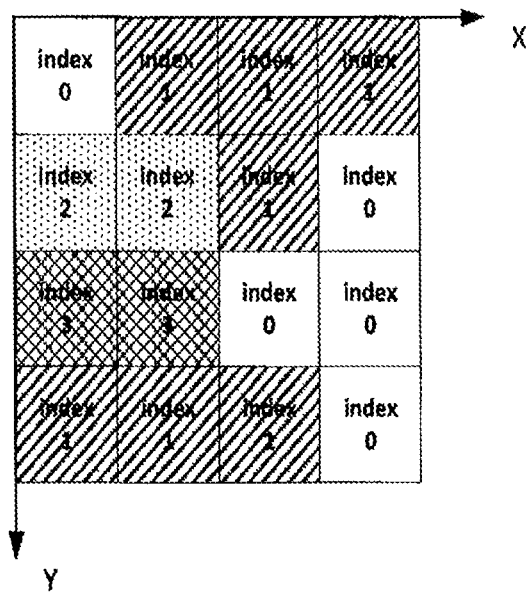
FIG. 11 is indexes assigned to the pixel block of FIG. 9 (four color palettes, threshold A=9).

A distance between a thirteenth target pixel (R=0, G=0, B=0) and each typical color has the minimum "256 (=128+64+64)" at palettes 1 and 3. This minimum distance is larger than the threshold A (No at S104). Accordingly, processing is forwarded to S105. The decision unit 103 checks whether the number of typical colors is larger than the upper limit (S105). Here, the number of typical colors newly added is already equal to the upper limit (=4) (Yes at S105). Accordingly, processing is forwarded to S107. As to the thirteenth target pixel, the distance has the minimum at a plurality of typical colors (palettes 1 and 3). In this case, for example, a smaller index among indexes corresponding to the typical colors may be selected. Furthermore, an index already used by adjacent target pixel in the pixel block may be selected. In the first embodiment, a smaller index is preferentially assigned. The decision unit 103 assigns an index 1 to the thirteenth target pixel. Hereinafter, in the same way, the index 1 is assigned to a fourteenth target pixel and a fifteenth target pixel. Last, as to a sixteenth target pixel, a distance has the minimum (=64) at a typical color of palette 0. Accordingly, the decision unit 103 assigns an index 0 to the sixteenth target pixel. FIG. 11 shows indexes assigned to target pixels after above-mentioned processing is executed to all target pixels in the pixel block.

Continually, in case that the threshold A is a larger value, operation thereof will be explained. Hereinafter, on assumption that the threshold A is "96" and the upper limit is "4", the operation is explained. Until a fourth target pixel among target pixels in the pixel block, the same processing as above-mentioned case of "A=9" is repeated. FIG. 18 shows palettes stored in the storage unit 104 after the fourth target pixel is already processed. As shown in FIG. 18, two typical colors are newly added. Next, a distance between a fifth target pixel (R=128, G=96, B=128) and each typical color (stored in the storage unit 104) has the minimum "32" at palette 0. This minimum distance is smaller than the threshold A. The decision unit 103 assigns the index 0 to the fifth target pixel (S107). In the same way, as to a sixth target pixel, the index 0 of palette 0 at which the minimum distance is smaller than the threshold A is assigned thereto. As to a seventh target pixel and an eighth target pixel, color information thereof is same as typical colors (of palettes 1 and 0 at which the minimum distance is respectively zero) already stored in the storage unit 104. Accordingly, indexes 1 and 0 are respectively assigned to the seventh target pixel and the eighth target pixel.

Figure 12:
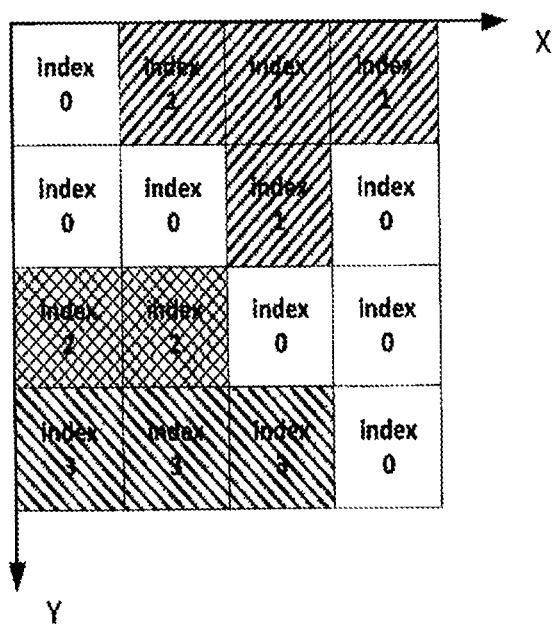
FIG. 12 is indexes assigned to the pixel block of FIG. 9 (four color palettes, threshold A=96).
Figure 20:
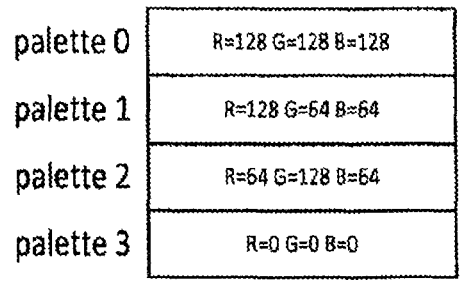
FIG. 20 is one example of typical colors in the four color palettes (when sixteen pixels are processed, threshold A=96).

Next, a distance between a ninth target pixel (R=64, G=128, B=64) and each typical color has the minimum "128 (=64+64)" at palettes 0 and 1. This minimum distance is larger than the threshold A (No at S104). Accordingly, processing is forwarded to S105. The decision unit 103 checks whether the number of typical colors stored in the storage unit 104 is larger than the upper limit (S105). Here, the number of typical colors stored in the storage unit 104 is two, and smaller than the upper limit (=4) (No at S105). Accordingly, the decision unit 103 adds a color of the eight target pixel to a palette 2 (stored in the storage unit 104) as a new typical color (S106). FIG. 12 shows assignment result of indexes after above-mentioned processing is executed to all target pixels in the pixel block. FIG. 20 shows typical colors stored in the storage unit 104.

In above-mentioned first embodiment, the comparison unit 102 calculates the distance a based on the equation (1). However, in a first modification, the comparison unit 102 calculates distances b~d based on a plurality of equations. The decision unit 103 may decide whether to add a new typical color based on thresholds for respective equations.

For example, hereinafter, the case that following distances b~d are newly added will be explained.

$$\text{Distance } b = |(R \text{ of the target pixel}) - (R \text{ of the typical color})|$$

$$\text{Distance } c = |(G \text{ of the target pixel}) - (G \text{ of the typical color})|$$

$$\text{Distance } d = |(B \text{ of the target pixel}) - (B \text{ of the typical color})| \quad (2)$$

For example, the comparison unit 102 calculates a distance a, and determines a typical color having the minimum distance a. If this minimum distance is larger than a threshold α, the decision unit 103 adds a color of the target pixel as a new typical color. If the minimum distance is smaller than (or equal to) the threshold a, the comparison unit 102 calculates respective distances b~d between the typical color (having the minimum distance a) and color of the target pixel. The decision unit 103 compares respective distances b~d with a threshold β. If all distances b~d are smaller than (or equal to) the threshold β, the decision unit 103 assigns an index of the typical color (having the minimum distance a) to the target pixel. If any of distances b~d is larger than the threshold β, the decision unit 103 adds a color of the target pixel as a new typical color.

As mentioned-above, in the first modification, typical colors are decided based on a plurality of distances a-d and two thresholds α and β. Accordingly, a large distortion of a specific color is suppressed. As a result, subjective image quality can be raised.

Figure 6:
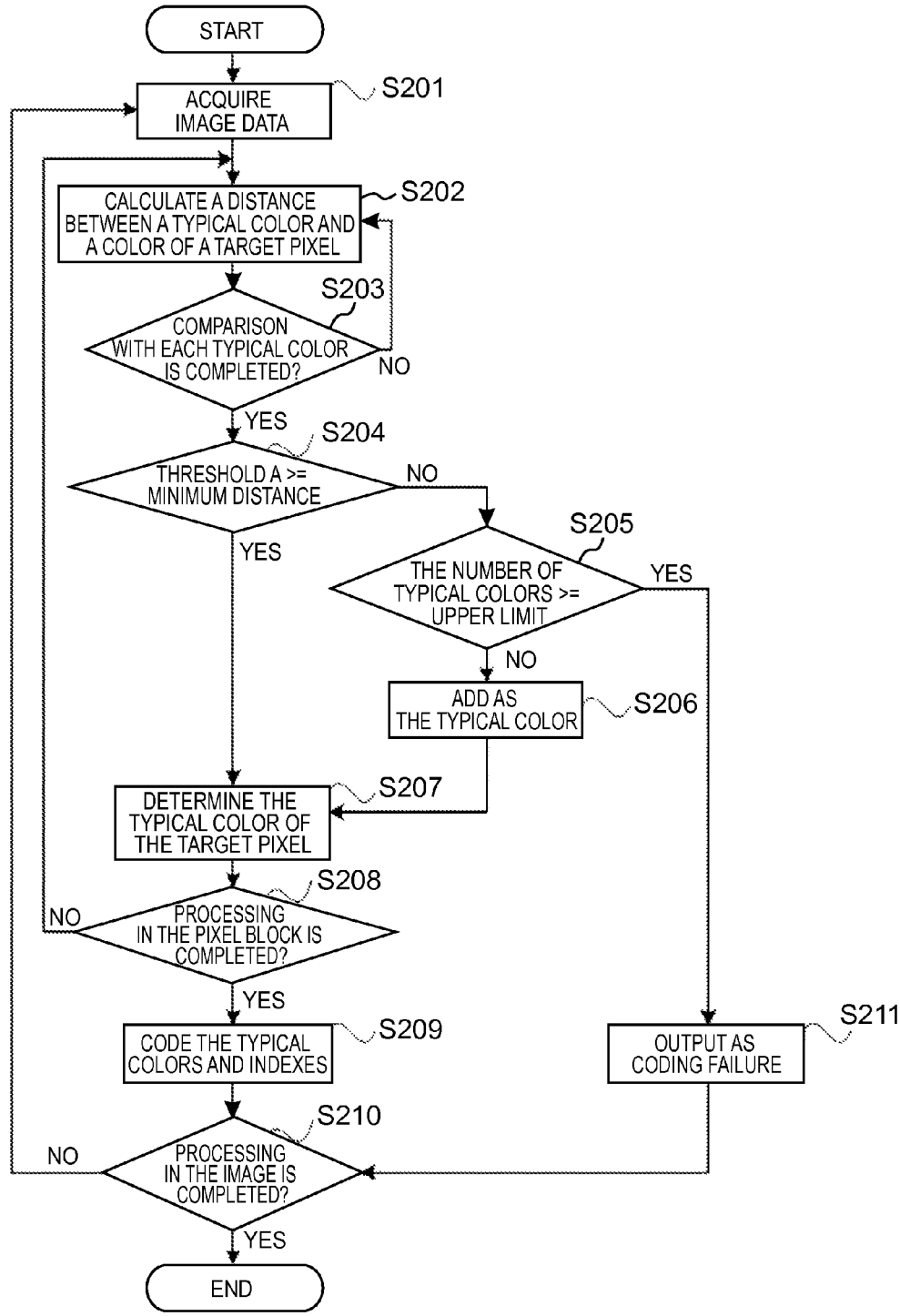
FIG. 6 is a flow chart of processing of the image coding apparatus according to a modification of the first embodiment.

As a second modification of the first embodiment, when the number of typical colors newly added is equal to the upper limit of typical colors storable into the storage unit 104, the processing step different from S105 in FIG. 5 will be explained. FIG. 6 is a flow chart of processing according to the second modification. In comparison with the first embodiment in FIG. 5, different processing is only explained. In the second modification, when the decision unit 103 confirms that the number of typical colors newly added is equal to the upper limit (Yes at S205), the coding unit 105 outputs a coding failure (S211). As a result, coded data larger than the distortion amount allowed by the threshold A cannot be generated. On the other hand, the coding failure is outputted according to the threshold A. As a result, coded data cannot be often generated. In order to avoid the latter case, in the second modification, an image coding system shown in FIG. 4 is effectively used.

Figure 4:
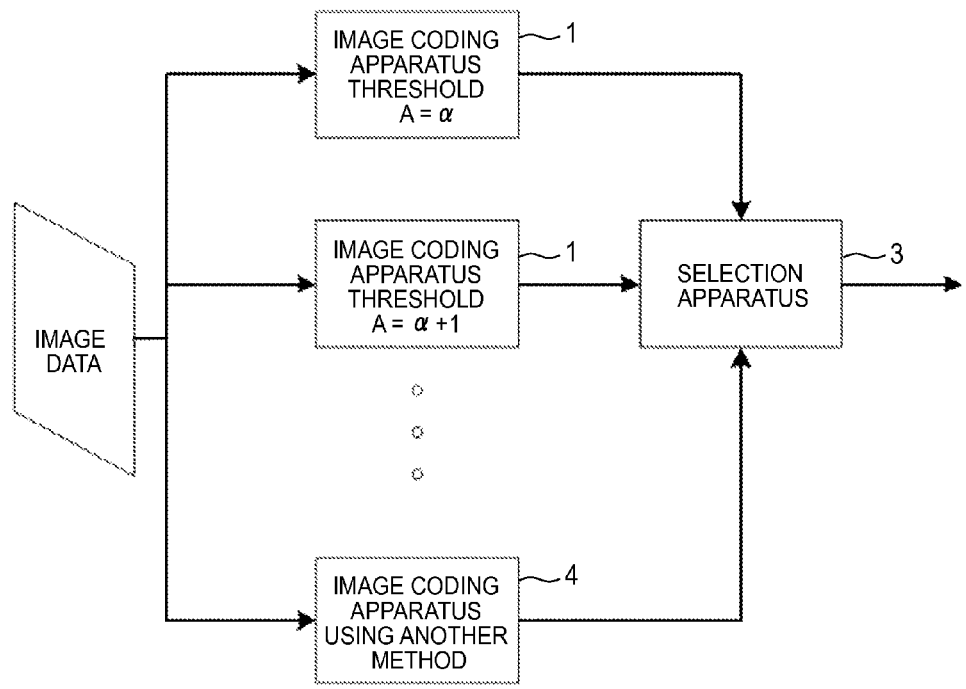
FIG. 4 is a block diagram of an image coding system including the image coding apparatus of the first embodiment.

FIG. 4 is a block diagram of the image coding system including a plurality of image coding apparatuses 1 of FIG. 1. Respective image coding apparatuses 1 have a different threshold A, and operate in parallel. From coded data outputted (by succeeding in coding) from the plurality of image coding apparatuses 1, a selection apparatus 3 selects coded data outputted by one image coding apparatus 1 having the smallest threshold A, and outputs the selected coded data. As a result, coded data having high quality can be generated. Furthermore, for example, by utilizing an image coding apparatus 4 that uses another coding method such as JPEG or MPEG, high effective coding can be executed to not only graphic images but also images having various characteristics. When the image coding apparatus 1 is utilized with the image coding apparatuses 1, for example, the selection apparatus 1 selects desired coded data based on a distortion amount or a size of coded data acquired from the image coding apparatuses 1 and 4.

Figure 7:
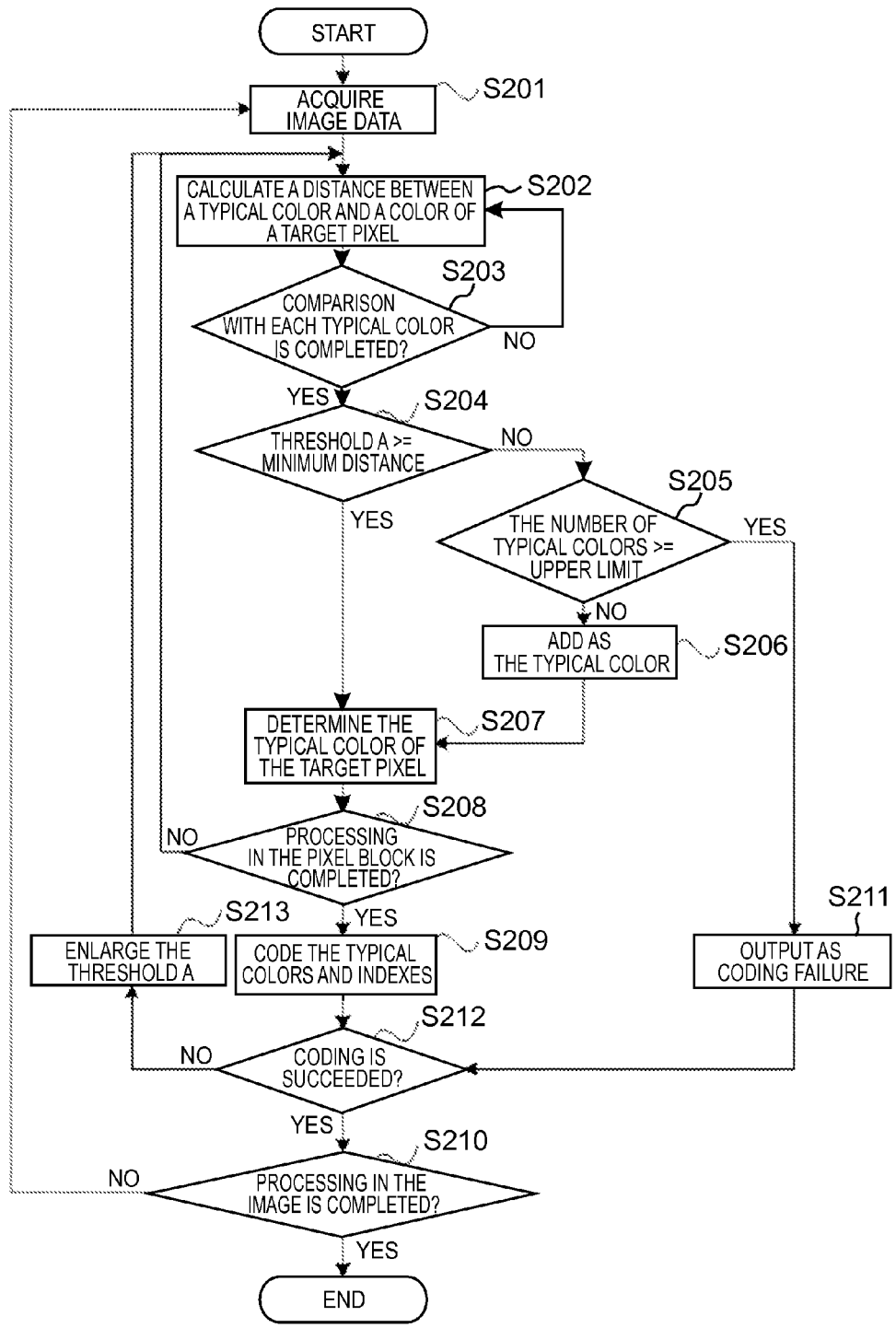
FIG. 7 is a flow chart of processing of the image coding apparatus according to another modification of the first embodiment.

FIG. 7 shows a flow chart of image coding processing according to a third modification of the first embodiment. In comparison with FIG. 6, a step (S212) for the decision unit 103 to decide whether to succeed in coding is added. When the coding is decided to be failed (No at S212), the decision unit 103 enlarges (makes) a value of the threshold A (be larger) (S213).

In the system of FIG. 4, a plurality of the image coding apparatuses 1 executes in parallel. However, according to a value range of the threshold A, great many image coding apparatuses 1 must be located in parallel. In the third modification, for example, by gradually enlarging the threshold A starting from A=0 (i.e., lossless coding), a suitable threshold A can be set with only one image coding apparatus 1. Especially, the third modification is effective for the case of software-packaging.

As a fourth modification of the first embodiment, an initial state of typical colors stored in the storage unit 104 may be not N/A, and, for example, palette 0 may be a color of the first target pixel in the pixel block. FIG. 14 shows the initial state of typical colors according to the fourth modification. If a distance between N/A of the initial state and a color of the first target pixel is infinite, the color of the first target pixel is always added to a new typical color. However, for example, even if the initial state is determined as not N/A but a specific value (such as R=0, G=0, B=0), only palette 0 may be specifically treated. By setting a color of the first target pixel to palette 0, an index to be assigned to the first target pixel is unnecessary. As a result, in FIG. 21, the number of indexes is decremented to ((the number of pixels in the pixel block)−1), and the coding amount can be deleted.

Figure 3:
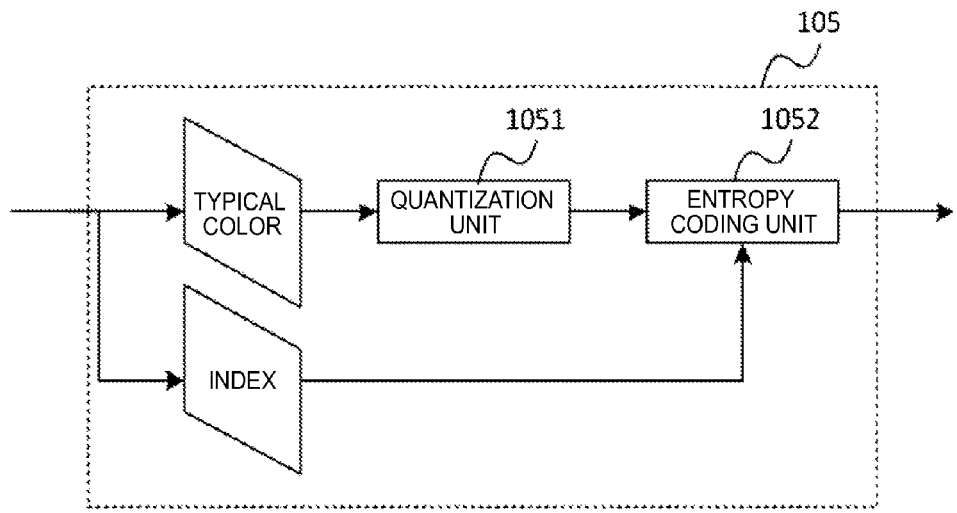
FIG. 3 is a block diagram of a coding unit in FIG. 1 according to the first embodiment.
Figure 22:
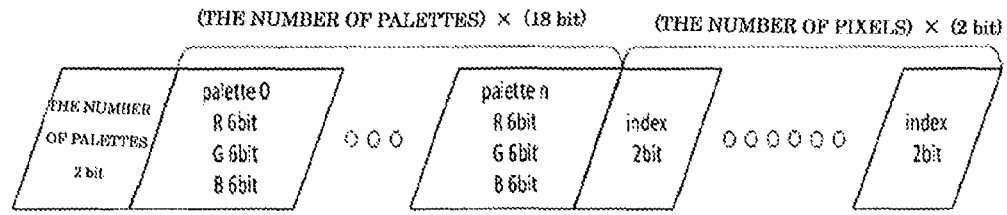
FIG. 22 is a schematic diagram of one example of data structure (when quantization of typical colors is performed).

As a fifth modification of the first embodiment, by quantizing typical colors by the coding unit 105 at S109, image data can be coded with higher compression ratio. FIG. 3 is a block diagram of the coding unit 105 according to the fifth modification. As shown in FIG. 3, the coding unit 105 includes a quantization unit 1051 to quantize typical colors, and an entropy coding unit 1052 to code index information with entropy. The index information is inputted to the entropy coding unit 1052 without special processing, and typical colors are inputted to the entropy coding unit 1052 via the quantization unit 1051. As a method for quantizing typical colors, for example, by uniformly dropping low order bits from eight bits information, this information is quantized as six bits. FIG. 22 shows data structure of coded data according to the fifth modification. For example, if the upper limit of the number of typical colors is four, the data structure is shown in FIG. 22. In comparison with the data structure of the first embodiment shown in FIG. 21, higher compression ratio can be realized.

According to the first embodiment and various modifications, color palette image coding can be realized without calculation of histogram for color of all pixels. Accordingly, the memory capacity necessary for this processing can be greatly reduced. Furthermore, processing is executed while the typical color is determined in order. Accordingly, image scan need not be repeated. As a result, this image coding is especially effective for hardware-packaging.

For example, by installing this image coding apparatus into a device or a system to process CG image data such as PC screen, the transmission velocity can be raised, and memory capacity such as DRAM to store CG image data can be reduced. However, usage of the first embodiment is not limited to above-mentioned usage.

The Second Embodiment

In the image coding apparatus 2 of the second embodiment, a histogram for each typical color is calculated, and the threshold A is adjusted based on a distribution of the histogram. This feature is different from the image coding apparatus 1 of the first embodiment.

Figure 2:
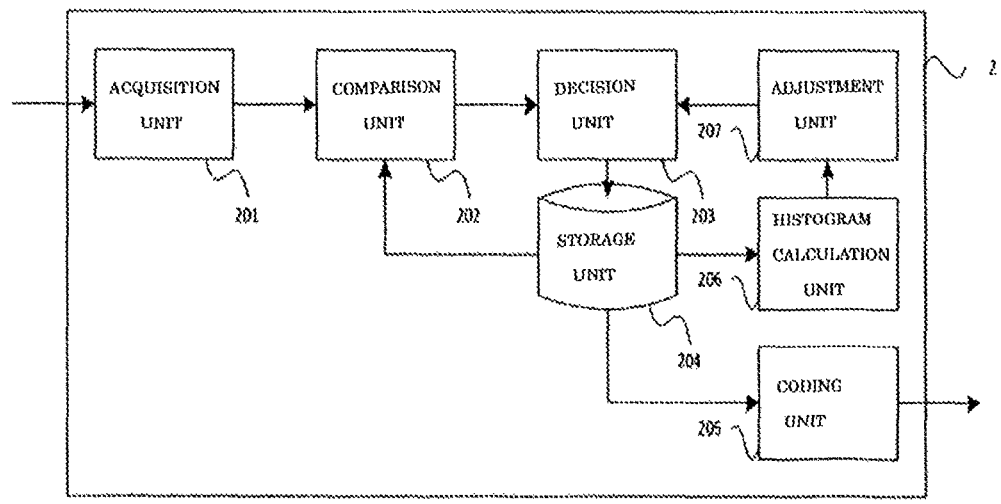
FIG. 2 is a block diagram of an image coding apparatus according to the second embodiment.

FIG. 2 is a block diagram of the image coding apparatus 2. In comparison with the image coding apparatus 1 of the first embodiment, the image coding apparatus 2 includes a histogram calculation unit 206 and an adjustment unit 207. The histogram calculation unit 206 calculates a histogram by accumulating the number of pixels (in the pixel block) assigned to each typical color. The adjustment unit 207 adjusts the threshold A based on the histogram.

Figure 8:
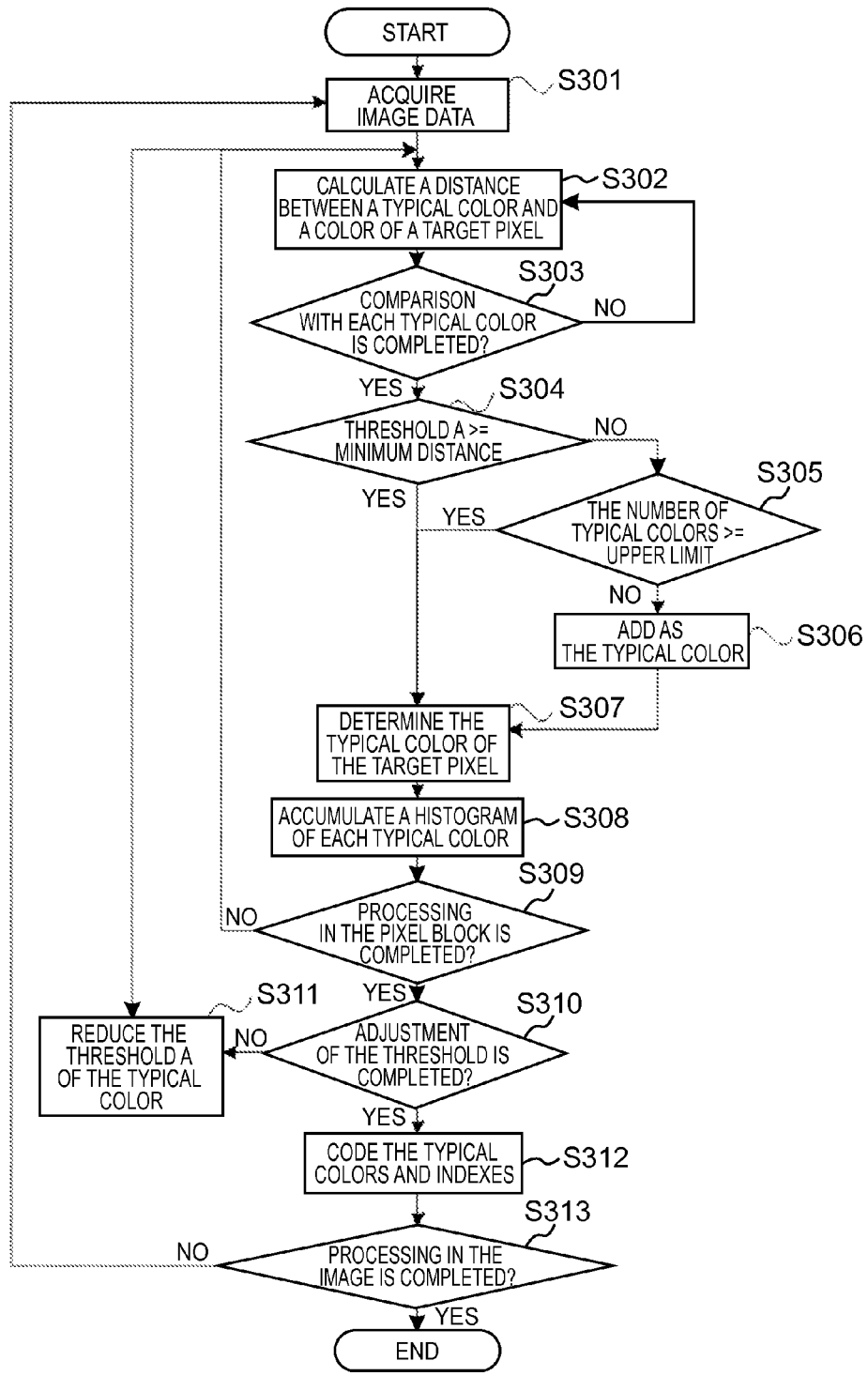
FIG. 8 is a flow chart of processing of the image coding apparatus according to the second embodiment.

FIG. 8 is a flow chart of processing of the image coding apparatus 2. Processing different from the image coding apparatus 1 is only explained. In following explanation, operation to code the pixel block shown in FIG. 9 is explained as an example. The upper limit of the number of typical colors stored in the storage unit 204 is eight. A threshold An (n=0~7) used by the decision unit 203 represents the threshold applied to each typical color palette n (n=0~7).

Figures 23, 24A, 24B:
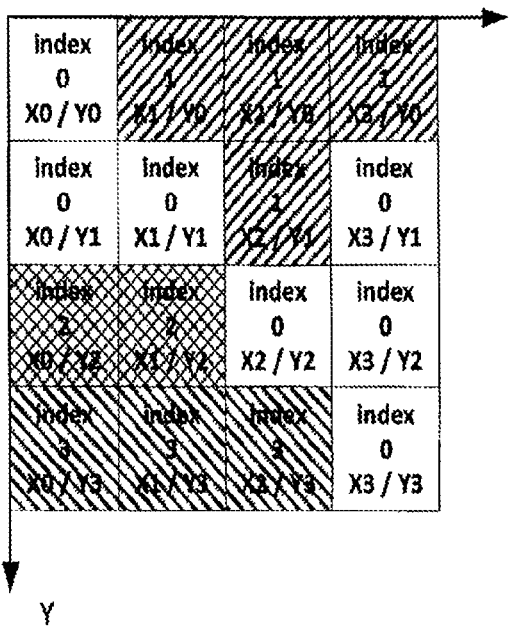
FIG. 23 is indexes assigned to the pixel block of FIG. 9 (when processing at the first path is performed, eight color palettes, threshold A=96).
FIGS. 24A and 24B are one example of typical colors in the eight color palettes and the number of pixels assigned to each palette therein.

If all thresholds An (n=0~7) are "96", after the image coding apparatus 2 executes same processing (S301~S309) as the image processing apparatus 1, as shown in FIG. 23, indexes of typical colors are assigned to target pixels in the pixel block. Furthermore, as shown in FIG. 24A, typical colors are stored in the storage unit 204.

In the image coding apparatus 2, different from the first embodiment, the histogram calculation unit 206 calculates a histogram by accumulating the number of pixels (in the pixel block) assigned to each typical color (S206). FIG. 24B shows one example of the histogram calculated by the histogram calculation unit 206. In FIG. 24B, a coordinate of the target pixel in the pixel block is represented as (Xn, Yn). For example, a coordinate of the left upper target pixel in the pixel block is represented as X0/Yo. As a result of the histogram, the number of target pixels to which palette 0 is assigned is the largest (seven). Consequently, the number of target pixels is larger in order of palette 1, palette 3, and palette 2.

The decision unit 203 checks whether typical colors are already assigned to all target pixels in the image block (S309). Based on the histogram, the adjustment unit 207 checks whether to adjust the threshold An (S310). In order to represent a typical color (palette x) assigned to the largest number of target pixels by typical colors having higher accuracy, the adjustment unit 207 reduces (makes) the threshold x (be smaller) (S311).

For example, a value that pixels are averagely assigned to each typical color, i.e., ((the number of target pixels in the pixel block)/(the number of typical colors)), is a threshold C. If target pixels of which the number is larger than the threshold C are assigned to a specific typical color, adjustment of the threshold is decided to be necessary (No at S310). In FIG. 24B, target pixels of which the number is larger than the threshold C ((sixteen pixels)/(four palettes)=4) are assigned to palette 0. Accordingly, the threshold A0 is adjustment target at S311. In this example, the case of selecting one typical color is already explained. However, a plurality of thresholds may be adjusted based on a plurality of typical colors corresponding thereto. Moreover, by repeating S311, scan of the pixel block is repeatedly performed. Accordingly, for example, by setting an upper limit to the number of adjustment processing, the number of repeat processing may be limited (For example, the upper limit is two times).

The adjustment unit 207 adjusts a value of the threshold Ax to be smaller than the present value. As to the adjustment amount, any method may be used. For example, the threshold may be simply reduced to a half of the present value. Furthermore, based on the number of typical colors able to be further added (In the second embodiment, 4 (=8−4) typical colors), the adjustment amount may be adjusted. In this case, for example, the threshold Ax is set to (Ax/(1+the number of typical colors able to be added)). As a result, if the number of typical colors able to be added is larger, the threshold is smaller than Ax. In the second embodiment, the threshold is simply reduced to a half of the present value (A0=96→48). However, according to the number of repeat processing (S310), the threshold A0 is automatically approximated to a suitable value. As a result, sufficient effect is obtained by simple adjustment method.

By setting thresholds to "A0=48 and An (n=1~7)=96", the comparison unit 202 calculates each typical color and the target pixel again (S302). In this case, as typical colors stored in the storage unit 204, new typical colors already added are used. In case of operating at the second time, until the fifteenth target pixel in the pixel block, the same assignment result of indexes as the first time is obtained. As to the sixteenth target pixel in the pixel block, a distance between a color thereof and each typical color has the minimum (64) at palette 0, and this minimum distance is larger than the threshold A0 (No at S304). The decision unit 203 adds the color of the sixteenth target pixel to palette 4 as a new typical color (S305, S306).

Figures 25, 26:
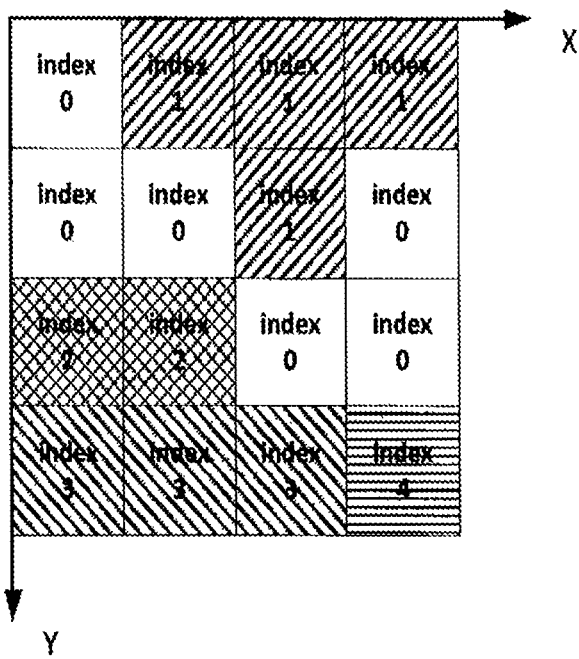
FIG. 25 is indexes assigned to the pixel block of FIG. 9 (when processing at the second path is performed, eight color palettes, threshold A=48).
FIG. 26 is indexes assigned to the pixel block of FIG. 9 (when processing at the second path is performed, threshold A0=48).

FIG. 25 shows assignment result of indexes after above-mentioned processing is executed to all target pixels in the pixel block. FIG. 26 shows typical colors stored in the storage unit 104 thereat.

Moreover, in the image coding apparatus 1, as the threshold A, same value is commonly used for all typical colors. On the other hand, in the image coding apparatus 2, as the threshold A, different value can be set to each typical color. For example, a threshold A0 is set to palette 0, and another threshold A1 is set to palette 1.

As to two thresholds α and β explained in the first modification of the first embodiment, different threshold can be set to each typical color. For example, two thresholds α0 and β0 are set to palette 0, and two thresholds α1 and β1 are set to palette 1.

Furthermore, in the second modification that a plurality of image coding apparatuses 1 executes processing in parallel, each image coding apparatus 1 can use different threshold respectively. For example, a first image coding apparatus 1 uses a threshold A0 as palette 1 and a threshold A1 as palette 1. A second image coding apparatus 1 uses a threshold A'0 as palette 1 and a threshold A'1 as palette 1.

According to the second embodiments, the threshold An is automatically controlled while the memory capacity necessary to calculate the histogram is reduced. As a result, suitable typical colors can be generated.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for coding an image, comprising:
acquiring a pixel block having a predetermined size from image data to be coded;
calculating a distance between a color of a target pixel in the pixel block and each of a plurality of typical colors;
selecting a typical color of which the distance is a minimum distance from the plurality of typical colors;
assigning a first index representing the selected typical color to the target pixel if the minimum distance is smaller than a first threshold;
assigning a second index representing a new typical color to the target pixel if the minimum distance is larger than or equal to the first threshold;

adding the new typical color as one of the typical colors when the second index is assigned; and coding the selected typical color, the new typical color, the first index and the second index, wherein, if adding the new typical color would cause the number of typical colors to be larger than an upper limit, not adding the new typical color as one of the typical colors and assigning the first index to the target pixel, wherein the first threshold is determined for each typical color, wherein the method further comprises:

calculating a histogram by accumulating the number of target pixels to which the each typical color is assigned; and adjusting a value of the first threshold of the each typical color based on the histogram, and wherein the assigning includes using the first threshold differently adjusted for the each typical color.

2. The method according to claim 1,
wherein the adjusting includes
making the value of the first threshold of a typical color be smaller when the number of target pixels to which the typical color is assigned in the histogram is larger than a second threshold.

3. The method according to claim 1, further comprising:
checking if adding the new typical color would cause the number of typical colors to be larger than the upper limit when the minimum distance is larger than the first threshold; and outputting a coding failure instead of coded data when the number of the typical colors after adding the new typical color is larger than the upper limit.

4. The method according to claim 1, wherein
a color of a first target pixel in the pixel block is added as the new typical color.

5. The method according to claim 1, wherein
the typical color is coded with quantization.

6. An apparatus for coding an image, comprising:
an acquisition unit, executed by a computer using a program stored in a memory device, configured to acquire a pixel block having a predetermined size from image data to be coded;

a comparison unit, executed by the computer, configured to calculate a distance between a color of a target pixel in the pixel block and each of a plurality of typical colors, and to select a typical color of which the distance is a minimum distance from the plurality of typical colors;

a decision unit, executed by the computer, configured to assign a first index representing the selected typical color to the target pixel if the minimum distance is smaller than a first threshold, to assign a second index representing a new typical color to the target pixel if the minimum distance is larger than or equal to the first threshold, and to add the new typical color as one of the typical colors when the second index is assigned; and a coding unit, executed by the computer, configured to code the selected typical color, the new typical color, the first index and the second index, wherein, if adding the new typical color would cause the number of typical colors to be larger than an upper limit, the decision unit is configured to not add the new typical color as one of the typical colors and to assign the first index to the target pixel, wherein the first threshold is determined for each typical color, wherein the apparatus further comprises:

a histogram calculation unit configured to calculate a histogram by accumulating the number of target pixels to which the each typical color is assigned; and an adjustment unit configured to adjust a value of the first threshold of the each typical color based on the histogram, and wherein the decision unit uses the first threshold differently adjusted for the each typical color.

7. The apparatus according to claim 6, wherein
the decision unit is configured to check if adding the new typical color would cause the number of typical colors to be larger than the upper limit when the minimum distance is larger than the first threshold, and the coding unit is configured to output a coding failure instead of coded data when the number of the typical colors after adding the new typical color is larger than the upper limit.

8. The apparatus according to claim 6, wherein
a color of a first target pixel in the pixel block is added as the new typical color.

9. The apparatus according to claim 6, wherein
the coding unit codes the typical color with quantization.

10. The apparatus according to claim 6, wherein
the adjustment unit is configured to make the value of the first threshold of a typical color smaller when the number of target pixels to which the typical color is assigned in the histogram is larger than a second threshold.

11. A system for coding an image, comprising:
a plurality of image coding apparatuses, each of the image coding apparatuses comprising:

an acquisition unit, executed by a computer using a program stored in a memory device, configured to acquire a pixel block having a predetermined size from image data to be coded;

a comparison unit, executed by the computer, configured to calculate a distance between a color of a target pixel in the pixel block and each of a plurality of typical colors, and to select a typical color of which the distance is a minimum distance from the plurality of typical colors;

a decision unit, executed by the computer, configured to assign a first index representing the selected typical color to the target pixel if the minimum distance is smaller than a first threshold, to assign a second index representing a new typical color to the target pixel if the minimum distance is larger than or equal to the first threshold, and to add the new typical color as one of the typical colors when the second index is assigned; and a coding unit, executed by the computer, configured to code the selected typical color, the new typical color, the first index and the second index, wherein each of the image coding apparatuses has a different first threshold; and a selection apparatus configured to selectively output coded data from an image coding apparatus of which the first threshold is the smallest, among coded data outputted from the image coding apparatuses.

12. The system according to claim 11, wherein
the decision unit is configured to check if the adding the new typical color would cause the number of typical colors to be larger than an upper limit when the minimum distance is larger than the first threshold, and the coding unit is configured to output a coding failure instead of coded data when the number of the typical colors after adding the new typical color is larger than the upper limit.

* * * * *